(12) United States Patent
Yagisawa et al.

(10) Patent No.: US 6,886,075 B2
(45) Date of Patent: Apr. 26, 2005

(54) MEMORY DEVICE SYSTEM AND METHOD FOR COPYING DATA IN MEMORY DEVICE SYSTEM

(75) Inventors: Ikuya Yagisawa, Tokyo (JP); Naoto Matsunami, Hayama (JP); Yasuyuki Mimatsu, Yokohama (JP); Akihiro Mannen, Yokohama (JP); Kenji Muraoka, Odawara (JP)

(73) Assignee: Hitachi, Ltd., Tokyo (JP)

( * ) Notice: Subject to any disclaimer, the term of this patent is extended or adjusted under 35 U.S.C. 154(b) by 197 days.

(21) Appl. No.: 10/087,524

(22) Filed: Feb. 28, 2002

(65) Prior Publication Data

US 2002/0188802 A1 Dec. 12, 2002

(30) Foreign Application Priority Data

Feb. 28, 2001 (JP) .................................... 2001-053459

(51) Int. Cl.⁷ .............................................. G06F 12/00
(52) U.S. Cl. ........................ 711/114; 711/162; 711/173
(58) Field of Search ............................. 711/112, 114, 711/154, 162, 165, 173; 707/204; 714/6; 345/544

(56) References Cited

U.S. PATENT DOCUMENTS

| | | | |
|---|---|---|---|
| 5,051,887 A | | 9/1991 | Berger et al. |
| 5,664,187 A | * | 9/1997 | Burkes et al. .............. 707/205 |
| 5,790,773 A | * | 8/1998 | DeKoning et al. ............. 714/6 |
| 5,835,940 A | * | 11/1998 | Yorimitsu et al. .......... 711/112 |
| 6,079,029 A | * | 6/2000 | Iwatani et al. ................. 714/6 |
| 6,332,177 B1 | * | 12/2001 | Humlicek ................... 711/114 |
| 6,615,284 B1 | * | 9/2003 | Schatzberg .................... 710/1 |

* cited by examiner

*Primary Examiner*—Pierre M. Vital
(74) *Attorney, Agent, or Firm*—Townsend and Townsend and Crew LLP

(57) ABSTRACT

In a memory apparatus, there are provided a mirror primary LU which is a memory region on a plurality of storage media formed of nD+1P, a mirror secondary LU that is a memory region on a plurality of storage media formed of mD+1P, an n-RAID control sub-program for performing RAID control of nD+1P, an m-RAID control subprogram for performing RAID control of mD+1P, and an LU mirror subprogram for performing writing into the mirror primary LU and mirror secondary LU and then effectuating duplexing or "mirroring" when a computer issues a data write request. The "m" and "n" are different integers more than or equal to 2.

7 Claims, 7 Drawing Sheets

FIG. 2

| LBA SET NUMBER | UPDATE BIT |
|---|---|
| 0 | 0 |
| 1 | 1 |
| 2 | 0 |
| 3 | 0 |
| 4 | 0 |
| 5 | 0 |
| 6 | 0 |
| 7 | 0 |
| 8 | 0 |
| 9 | 0 |
| | |

FIG. 5

| STRIPE PARTITION OF LU 261 | STRIPE PARTITION OF LU 262 | LBA SET NUMBER | UPDATED BIT |
|---|---|---|---|
| ↑nX0 | ↑mX0 | 0 | 0 |
|  |  | 1 | 0 |
| ↑nX1 |  | 2 | 0 |
|  |  | 3 | 0 |
| ↑nX2 | ↑mX1 | 4 | 0 |
|  |  | 5 | 0 |
| ↑nX3 |  | 6 | 0 |
|  |  | 7 | 1 |
|  | ↑mX2 | 8 | 1 |
|  |  | 9 | 1 |
|  |  | 10 | 0 |
|  |  | 11 | 0 |
|  |  | 12 | 0 |
|  |  | 13 | 0 |
|  |  | 14 | 0 |
|  |  | 15 | 0 |

222 UPDATE POSITION MANAGEMENT TABLE

MEMORY DEVICE SYSTEM AND METHOD FOR COPYING DATA IN MEMORY DEVICE SYSTEM

BACKGROUND OF THE INVENTION

The present invention relates to a method for management of storage or "memory" regions in external memory device systems of computers and, in more particular, to a management method as to snap shots.

In memory devices such as fixed or "hard" disk drives (HDDs), it is required that data as recorded on a memory device be periodically copied for storage (backup) to another memory device such as a magnetic tape storage device for future use in the case of disappearance of data due to operation failure or obstruction of the memory device, software program defects, operation errors and the like. In such case, the data of interest for use as an object to be backed up (original data) will be updated during the backup; if mismatch is found between the backed up data and the data prior to execution of backup, then it will no longer be possible to reproduce any data at a time point that the backup gets started. Due to this, it is required to guarantee the matchability of data during copy operations.

To guarantee the matchability of data to be backed up, programs other than a backup program may be interrupted or halted while the backup program is being operating in a computer system. However, with a system under requirement for higher availability functions, it is impossible to interrupt the program for a long time. Due to this, there is required a systematic mechanism for forming in more than one backup-use memory device a layout location (to be referred to as "memory image" hereinafter) of data and the content of data as stored in a memory device at a backup startup time point while at the same time permitting any program to update data during backup operations. Here, let the memory image of data at a given time point be called a snap shot. In addition, let the mechanism for providing the state capable of updating data while forming a snap shot at any designated time point be called a snap shot management method. Additionally let the activity of forming a snap shot by the snap shot management method be called snap shot acquisition. Additionally let withdrawal of the state that has formed a snap shot be called snap shot deletion.

Prior known snap shot management methods include a method for duplexing or "mirroring" data.

With this method, in an ordinary or normal state in which any snap shots are not acquired yet, a program on a computer duplexes and stores all the data items in two separate memory regions. Upon acquisition of a snap shot, the duplexing or "mirroring" procedure is interrupted causing one region to be provided as the original data while letting the other region be provided as a snap shot.

In cases where update of the original data occurs during interruption of the mirroring, the position of any data thus updated is to be recorded. In a snap shot deletion event, data mirroring gets started again. In addition, based on a record of the position of such updated data, the updated data will be copied from the original data memory region to the other memory region. This copy operation will be called the mirror resynchronization. A method of mirroring data by use of a program on a computer is disclosed in U.S. Pat. No. 5,051,887 to Blaine H. Berger et al.

The above-noted two regions are generally constituted from a disk array in most cases. The disk array is arranged so that a plurality of disk devices are laid out into an array-like form. A memory device system including such disk array will be called the disk array apparatus hereinafter. The disk array apparatus is a memory apparatus which processes read and write requests from an upper-level or "supervisory" computer equipment (host) through parallel operations of disk devices at high speeds while at the same time improving the reliability by adding redundant data to the data being handled. The disk array can also be called the redundant array of inexpensive disks (RAID). Disk arrays are typically categorized into five levels depending upon the type and arrangement of the redundant data.

To ensure that the rate of access to a memory region with the original data being stored therein does not decrease during the use of a snap shot, the memory region of original data and the memory region of snap shot are formed of physically different disk arrays respectively. In addition, let the arrangement of disk devices in a disk array be represented by "nD+1P," where D is a disk device with data stored therein, and P is a disk device with redundant data stored therein. The formula nD+1P indicates the arrangement of n data recording disk devices and a single disk device with redundant data stored therein. Considering based on the arrangement of such disk devices, a disk array in which original data memory regions are laid out and a disk array in which memory regions used for snap shots are disposed are designed to have the same number of disk devices, that is, a configuration having the same n, wherein those being the same in storage capacity of individual disk devices are employed.

From several view points of performance and reliability plus costs or the like, different features are required for the memory region in which the original data is to be stored therein and for the memory region used for snap shots. One example is that the reliability is thought to be important in the memory region with the original data being stored therein whereas lower bit costs are required for the memory region used for snap shots. Additionally in some cases, higher performance is required for the memory region being used for snap shots in order to speed up the intended backup operations.

To be brief, it should be strictly required that each disk array be made up of specific disk devices different in performance, record density, storage capacity, reliability and the like. In this case, since the features required can be realized depending on the scheme for arranging the disk array (nD+1P), it is required that respective ones of the disk arrays with the original data memory region and the memory region used for snap shots being disposed therein be configured from nD+1P configurations having mutually different n values. However, in the prior art, it has been impossible or at least greatly difficult to realize any successful combination of disk arrays in which mutually flexible arrangements are employed.

SUMMARY OF THE INVENTION

It is therefore an object of the present invention to provide, in a disk array implemented to operate based on duplex/mirroring architectures in order to acquire snap shots used for backup sessions, a method capable of permitting respective disk arrays to employ mutually flexible arrangements by arranging the disk arrays each having a memory region with original data stored therein and a memory region used for a snap shot so that these have disk arrangements of nD+1P having mutually different n values.

To attain the foregoing object, the present invention provides, in a disk array as implemented to operate based on duplex or "mirroring" architectures in order to acquire a snap shot or shots, a mirror primary logical unit (LU) that is a memory region on a plurality of memory media arranged by nD+1P, a mirror secondary LU that is a memory region on a plurality of memory media arranged by mD+1P, an n-RAID control sub-program for performing RAID control of nD+1P, an m-RAID control subprogram for performing RAID control of mD+1P, and an LU mirror subprogram which writes into the mirror primary LU and the mirror secondary LU when a computer requests data write to thereby execute duplexing or "mirroring." Note here that the parameters "m" and "n" are integers more than or equal to two (2) and that m and n are different values.

BRIEF DESCRIPTION OF THE DRAWINGS

FIG. 2 is a diagram showing an updated position management table used in the first embodiment.

FIG. 5 is a diagram showing, in table form, a relationship of a mirror primary LU and a mirror secondary LU in the first embodiment in case the data recording disk device numbers n and m are set n<m.

DESCRIPTION OF THE EMBODIMENTS

Figure 1:
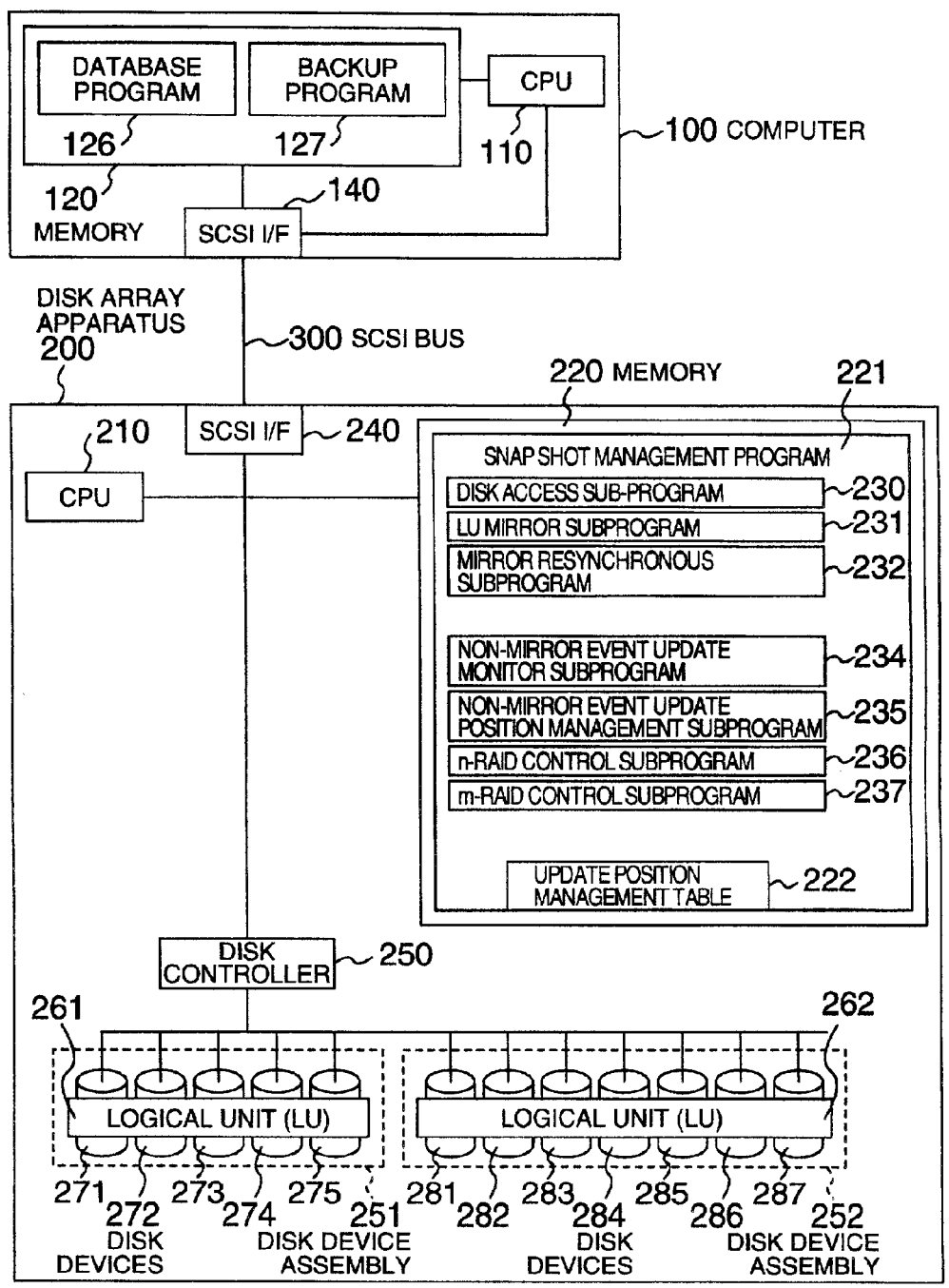
FIG. 1 is a diagram showing an overall configuration of a system in accordance with a first preferred embodiment of the present invention.

Referring to FIG. 1, there is depicted an overall arrangement of a computer system with data duplex/mirroring functionality in accordance with a first preferred embodiment of the present invention.

The illustrative system has a computer 100 and a disk array apparatus 200.

The computer 100 has a central processor unit (CPU) 110, a memory 120, and an interface 140 based on the currently established small computer system interface (SCSI) standards—say, SCSI interface. This SCSI interface 140 is connected to the disk array apparatus 200 via a SCSI data bus 300. The memory 120 stores therein a database program 126 and backup program 127. The both programs are executed by the CPU 110.

Although in this embodiment a back-up operation will be discussed as an utilization example of snap shots, the present invention will also be utilizable for other purposes such as on-line analytical processing (OLAP) and/or system testing and the like.

The database program 126 has a function of providing access to a logical unit (LU) 261 as will be described later in the description and also has a function of controlling data updating to the LU 261 to thereby execute a backup mode for guarantee of the matchability of data within the LU 261. The database program 126 shifts into the backup mode upon receipt of an instruction from either a user or the backup program 127. The backup program 127 has a function of reading data in order to back up data to a magnetic tape storage device such as tape cartridges or else (not shown) from an LU 262 with more than one snap shot saved therein in accordance with an instruction from the user, a function of issuing a "ModeSelect" command of SCSI toward the disk array apparatus 200, and a function of instructing to the database program 126 whether the backup mode is made valid or invalid—namely enabled or disabled.

The disk array apparatus 200 has a CPU 210, memory 220, SCSI interface 240, disk control unit or controller 250, and two separate disk device groups or assembles 251–252. Stored in the memory 220 is a snap shot management program 221. This program is to be executed by the CPU 210.

The disk device assembly 251 is a disk array which has a group of disk devices 271 to 275. The disk device assembly 252 is a disk array that has another group of disk devices 281–287. Each disk device assembly has a disk configuration of RAID level 5 with parity-added striping (i.e. striping with mirroring) being applied thereto. Note that although in this embodiment the disk device assembly 251 is set at 5 in number of disk devices whereas the disk device assembly 252 is 7 in disk device number, any available configurations are employable as far as the requisite number of disk devices in each disk device assembly is set at 3 or more and at the same time the disk device assemblies 251–252 are designed so that these are different in disk device number from each other. In the rest of the description, the numbers of disk devices of the disk device assemblies 251–252 will be represented as "nD+1P," "mD+1P," respectively. In this embodiment, n=4, m=6. In the present invention the parameters "n" and "m" as used herein are integers greater than or equal to 2 while letting n and m be different values.

The disk device assemblies 251–252 provide the computer 100 with memory regions owned by the plurality of disk devices as a single logical memory region. Practically, a logical unit (LU) that satisfies SCSI standards is provided to the computer 100. Let an LU as provided by the disk device assembly 251, 252 be LU 261, 262. Optionally a plurality of LUs may be provided within each disk device assembly 251, 252 when the need arises.

In this embodiment the snap shot management program 221 within the disk array 220 is designed to perform management while letting the LU 261 function as a mirror primary LU having original data and also letting the LU 262 act as a mirror secondary LU operable to store therein data of a duplicate copy or "mirror" of the original data. The LU 262 is for use as a snap shot(s).

The snap shot management program 221 of the disk array apparatus 200 has a disk access sub-program 230 for instruction of disk access to the disk controller 250 in accordance with a request from the computer 100, and an LU mirror subprogram 231 for duplexing or "mirroring" the update of data with respect to the LU 261 while also updating the data of LU 262 to thereby write the same user data into such two LUs.

The snap shot management program 221 of the disk array apparatus 200 also has an n-RAID control subprogram 236 and m-RAID control subprogram 237. The n-RAID control subprogram 236 controls the disk devices 271–275 as RAID 5 of nD+1P. The m-RAID control subprogram 237 controls the disk devices 281–287 as RAID 5 of mD+1P.

Further, the snap shot management program 221 has a non-mirror event update monitor subprogram 234 which detects the presence or absence of data update with respect to the mirror primary LU 261 for use as a mirror primary when the disk array apparatus 200 is halting or interrupting the duplex/mirroring processing (in a non-mirror event), a non-mirror event update position management subprogram 235 which records an updated position of data into an update position management table 222 to be later described, and a mirror re-synchronous subprogram 232 which copies any updated portion or portions of the mirror primary "source" LU 261 to the mirror secondary "destination" LU 262 upon execution of mirror resynchronization.

FIG. 2 is a diagram showing an arrangement of the update position management table 222. The update position management table 222 has regions for storage of logical block address (LBA) set numbers within the mirror primary LU 261 and updated bits corresponding to the LBA set numbers. LBA set is the individual partial region when the LU is subdivided from its top with more than one LBA being as a unit. The LBA set numbers are serial numbers which are assigned to the LBA sets. An update bit is indicative of whether any LBA set of the mirror primary LU 261 has been updated in the non-mirror event, to which 1, 0 will bi designated in accordance with "update" and "non-update," respectively. The initial set or "default" value of such update bit is 0. With the example of FIG. 2, there is shown the state that only a region of the LBA set number 1 has been updated in the non-mirror event.

Figure 3:
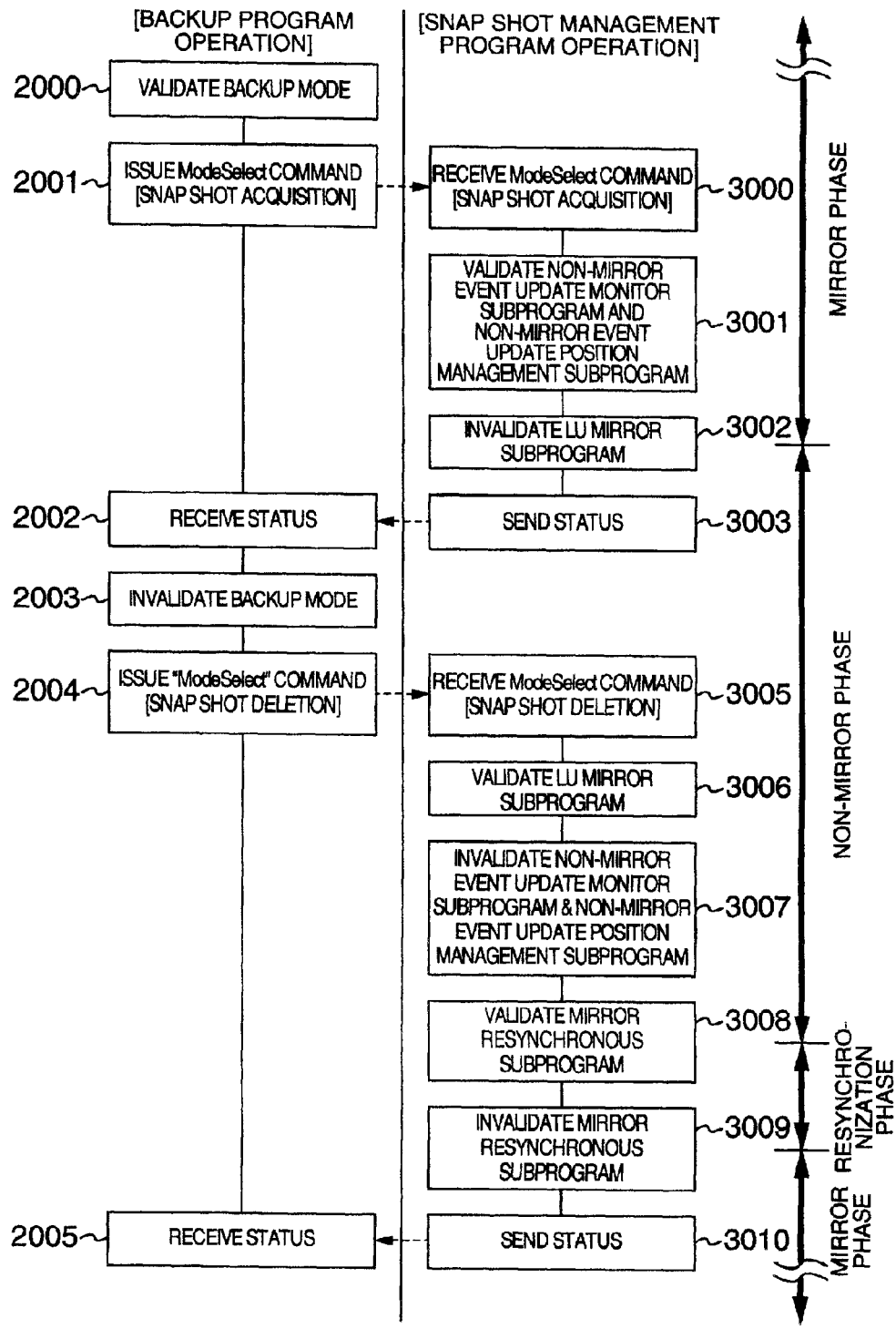
FIG. 3 depicts a snap-shot acquisition/deletion flow in the first embodiment.

FIG. 3 is a flow chart showing operations of the backup program 127 and the snap shot management program 221 in snap-shot acquisition/deletion events. Here, an explanation will be given of a case where the LU 262 for use as a mirror secondary LU of the mirror primary LU 261 is provided as a snap shot of LU 261.

As shown in FIG. 3, the backup program 127 of the computer 100 gives an instruction to the database program 126 and then validates or "enables" a backup mode to thereby guarantee the matchability of data for acquisition of a snap shot (at step 2000). Next, the backup program 127 issues to the disk array apparatus 200 a ModeSelect command for acquisition of a snap shot (at step 2001). Upon receipt (3000) of the ModeSelect command, the snap shot management program 221 of disk array apparatus 200 makes effective both the non-mirror event update monitor subprogram 234 and the non-mirror event update position management subprogram 235 and then starts update position recording of the LU 261 (at 3001). Thereafter, when the data of LU 261 is updated, an update bit of an LBA set including the updated LBA in the update position management table 222 is set at 1.

Next, the snap shot management program 221 makes invalid or "disables" the LU mirror subprogram 231 and then instructs termination of the duplex/mirroring processing of the data of LU 261 and LU 262. Whereby, data updating with respect to the LU 261 presently serving as the mirror primary LU will no longer be reflected on the LU 262 that acts as the mirror secondary LU (at step 3002 of FIG. 3). Next the snap shot management program 221 sends forth an end status of the ModeSelect command toward the backup program 127 of the computer 100 (at step 3003). Upon receiving of the end status of ModeSelect command (at 2002), the backup program 127 gives an instruction to the database program 126 for invalidation of the backup mode (2003).

Next, the backup program 127 issues to the disk array apparatus 200 a ModeSelect command which instructs snap shot deletion (at step 2004). Upon receipt of such ModeSelect command (at 3005), the snap shot management program 221 of disk array apparatus 200 validates the LU mirror subprogram 231 and then again starts or "restarts" mirroring of the LU 261 and LU 262 (3006). Whereby, the updating relative to LU 261 will be reflected on LU 262 also.

Next, the snap shot management program 221 invalidates the non-mirror event update monitor subprogram 234 and the non-mirror event update position management subprogram 235 and then halts update position recording of the LU 261 (at step 3007). Thereafter, the non-mirror event update position management subprogram 235 will no longer change the update bits of the update position management table 222.

Next the snap shot management program 221 validates the mirror resynchronous subprogram 232. The mirror resynchronous subprogram 232 refers to the update position management table 222 and then copies a portion with the LU 261 failing to be identical in content to the LU 262 from the LU 261 to LU 262 to thereby perform the intended mirror resynchronization (at step 3008 of FIG. 3). Once the resynchronization is terminated, the snap shot management program 221 invalidates the mirror resynchronous subprogram 232 (at step 3009) and then transfers an end status of ModeSelect command toward the backup program 127 of the computer 100 (at 3010). The backup program 127 that has received the end status of ModeSelect command finishes its operation (2005).

The backup program 127 of the computer 100 performs reading of the LU 262 that has acquired a snap shot in a session covering the step 2003 and step 2004 and then executes backup of such data in another memory device (not shown).

An explanation will be given of an operation of the mirror resynchronization for copying data from the LU 261 to LU 262 at step 3008 of FIG. 3.

See FIG. 5, which is a diagram showing a relationship of the LU 261, LU 262 and update position management table 222 in case the disk array arrangement of LU 261 and LU 262 is n<m.

The LU 261 is arranged so that a single parity is assigned to four LBA sets of data. One example is that a parity Pn0 is assigned relative to LBA sets 0 to 3. The parity Pn0 is the value that is subjected to an exclusive-OR (Ex-OR) operation of the LBA sets 0–3. Similarly a parity Pn1 is assigned to LBA sets 4–7; parity Pn2 is to LBA sets 8–11. Here, the plurality of LBA sets and a parity corresponding to a combination of such LBA sets will be called together as a "stripe array." For instance, the LBA sets 0–3 and parity Pn0 make up a stripe array. Note that although with RAID 5 the parities are dispersed and laid out in each disk device while exhibiting rotation, suppose in this embodiment that a unit of rotation is significant and thus any situation of dispersal layout will hardly appear in the case shown in the drawing.

The LU 262 is arranged so that a single parity is assigned to six (6) LBA sets of data. For example, a parity Pm0 is assigned to LBA sets 0 to 5.

It must be noted that data duplex/mirroring is executed between certain memory regions which are the same in LBA set numbers of the LU 261 and LU 262.

In FIG. 5, in order to indicate the relation of the update position management table 222 versus the LU's stripe array, a stripe partition of the LU 261 and LU 262 is additionally written on the left side of the update position management table 222. Note that as n and m are different in value from each other, a deviation would take place in the stripe partition of LU 261 and LU 262.

In the event of mirror resynchronization, an LBA set that fails to coincide in content between the LU 261 and LU 262 is copied from LU 261 to LU 262. At this time, data read processing is performed with respect to LU 261 whereas data write processing is done relative to LU 262.

In case data write is done to a disk array with its arrangement of RAID 5, in order to establish parity matching, read data of any update-free LBA set within the stripe array, and then execute an Ex-OR (XOR) operation including new data to thereby generate a new parity; thereafter, an operation for writing such new parity and new data into a disk device is performed. In this way, in the event of data writing to the disk array, a phenomenon that the number of access to those other than the data-written disk device increases is called the "write penalty."

It should be noted that in case data items of all the LBA sets of the stripe array are to be updated, a new parity is generated only from the LBA set to be written. In other words, it is no longer required to read the data of any update-free LBA sets within the stripe array in order to prepare the parity. Accordingly, this results in a mere increase in parity writing; thus, it is possible to accomplish the required task with minimal write penalty.

Assume here that a value "1" is set in the update bits of LBA set numbers 7 to 10 of the update position management table 222 and also that data of the condition-fulfilled LBA sets 7–10 during mirror resynchronization will be copied from the LU 261 to LU 262.

In an ordinary or normal copying session, read the data of LBA sets 7–10 of the LU 261 as surrounded by a thick lined or "fat" frame and then write into LBA sets 7–10 of LU 262 surrounded by a fat frame. In addition thereto, in order to establish parity matchability of the stripe array of LU 262, read an LBA set 6 and LBA set 11 of LU 262 as indicated by oblique lines; then, write into Pm1 of a disk device 287 a parity as has been generated through arithmetical processing of XOR with respect to LBA sets 7–10 of LU 261. Accordingly, in addition to parity write, read access must be done for reading the LBA set 6 and LBA set 11 of LU 262.

In the present invention, in order to suppress any possible write penalties, the n-RAID control subprogram 236 reads out of the LU 261 rather than LU 262 the data of LBA set 6 and LBA set 11 as indicated by oblique lines, and then prepares data for parity generation of the stripe array of LU 261. Thus it is no longer required to read the data of the LBA set 6 and LBA set 11 of LU 262 as indicated by oblique lines. Additionally, disk access to disk devices 271–274 would occur upon reading of the data of LBA sets 7–10 of LU 261; in such case, when reading the LBA set 10, consecutively read the LBA set 6 also in responding to receipt of a single disk command. Similarly, when reading the LBA set 7, consecutively read the LBA set 11 also in response to a single disk command. Disk access time includes a processing time in which a seek time of a read/write head assembly within a disk device and a rotation wait time of disk-like round plate(s) occupy major part thereof. Thus it is possible by reading the data in reply to a single disk command to eliminate or omit any rotation wait time of disk plate(s), which in turn makes it possible to reduce a disk access time relative to the LBA sets 6, 11.

To be brief, in the present invention, in cases where more than one LBA set is present which requires copying for mirror resynchronization, the n-RAID control subprogram 236 attempts to read data from the mirror primary LU in such a way as to permit assortment of all the LBA sets in the stripe array of the mirror secondary LU including a copy-necessary LBA set(s).

Determination of an LBA set(s) requiring reading from the mirror primary LU is performed in a way which follows.

In this embodiment, the LU 262 for use as the mirror secondary LU is m=6. Accordingly a single stripe array of the mirror secondary LU is made up from LBA blocks as designated by LBA set numbers of 6×p through 6×p+5, where p is an integer greater than or equal to 0. An LBA set number within the stripe array including a copy-required LBA set(s) for mirror resynchronization is specified by obtaining p as an integer part of the number of such copy-required LBA set for mirror resynchronization as divided by m=6.

For instance, in case an update bit corresponding to LBA set number 7 is 1, it becomes the integer part resulted from division of 7 by 6, that is, p=1; the number of an LBA set requiring reading is 6×p to 6×p+5, i.e. LBA set numbers 6 to 11. The n-RAID control subprogram 236 determines the exact position of any to-be-read LBA set on the basis of the LBA set number as has been specified from this p value and then reads data.

At the mirror secondary LU, the m-RAID control subprogram 237 executes writing of a copy-necessary LBA set and writing of a parity thus generated.

Additionally, detection of such copy-necessary LBA set is performed by letting the mirror resynchronous subprogram 232 refer to the update position management table 222. In case the copy-necessary LBA set is found within the stripe array of the mirror secondary LU, the mirror resynchronous subprogram 232 operates in such a way that it conducts a search to determine whether any other copy-necessary LBA sets are present within the same stripe array and, if any, copies such other LBA sets also. More specifically, the mirror resynchronous subprogram 232 searches for any LBA block with the update bit of update position management table 222 being presently set at 1. If such LBA set with its bit of 1 is found then the mirror resynchronous subprogram 232 refers to the update bit corresponding to another LBA set within the stripe array including such LBA set thus found and then verifies whether an LBA set of 1 is present or not. After having verified the LBA block with its update bit of 1 within the same stripe array, the mirror resynchronous subprogram 232 sends forth toward the m-RAID control subprogram 237 an instruction for performing copying with respect to any condition-fulfilled LBA block(s). In addition, it notifies the n-RAID control subprogram 236 of the value of p and then sends an instruction for reading an LBA block corresponding to p.

It is to be noted here that although the explanation above was given under an assumption that the mirror resynchronous subprogram 232 searches the update position management table 222 with respect to every stripe array of the mirror secondary LU, in case the copy-necessary LBA set bridges between neighboring stripe arrays in the mirror secondary LU, it may be modified to operate in such a way as to conduct a search to determine whether any other copy-necessary LBA sets are present within a plurality of neighboring stripe arrays also and then copy such other LBA sets also.

Also note that in view of the fact that there still remains the case incapable of reducing the disk access number, an alternative arrangement may also be employed which performs calculation of the read position of the LU 261 and the write position of the LU 262 in a way such that whenever detection is made of a normal copy, i.e., an LBA block with its update bit being presently set at 1, let the n-RAID control subprogram 236 and m-RAID control subprogram 237 immediately perform reading and writing of the subject LB blocks.

Figure 6:
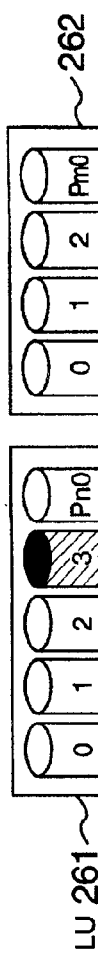
FIG. 6 is a diagram showing in table form a relation of the mirror primary LU and mirror secondary LU in the first embodiment in the case of n>m, along with an internal structure of each LU.

FIG. 6 is a diagram showing the LU 261, LU 262 and update position management table 222 in case the disk array arrangement of LU 261 and LU 262 is n>m. Here, an explanation will be given in the case of n=4, m=3.

The LU 261 shown herein is the same as that of FIG. 5.

The LU 262 is arranged so that a single parity is assigned to three LBA sets of data.

In a similar way to the case of FIG. 5, a stripe partition of the LU 261 and LU 262 is additionally written on the left side of the update position management table 222.

An explanation will be given of the case where update bits of the LBA set numbers 4–7 of the update position management table 222 are set at 1 and where data items of the subject LBA sets 4–7 are copied together from the LU 261 to LU 262 during mirror resynchronization processing, by way of example.

In the case of normal copying, read the LBA sets 4–7 of the LU 261 as surrounded by a fat frame; then, write into LBA sets 4–7 of the LU 262 surrounded by fat frame. Simultaneously, read an LBA set 3 and LBA set 8 of the LU 262 as indicated by oblique lines in order to establish the parity matchability of stripe arrays of LU 262. Then, execute XOR with the LBA set 3 as has been read out of the LBA sets 4–5 of LU 261. Next, write the parity thus generated into Pm1 of a disk device 284. Additionally, write into Pm2 of the disk device 284 a parity that was generated by execution of XOR with the LBA sets 6–7 of LU 261 and LBA set 8 read out of LU 262. Therefore, read access to the disk devices 281, 283 takes place in order to read the LBA sets 3, 8 of LU 262 other than writing of the parity.

In contrast thereto, in the present invention, in order to lighten and reduce any possible write penalties, the n-RAID control subprogram 236 reads the LBA set 3 and LBA set 8 as indicated by oblique lines from the LU 261 rather than from the LU 262 and then prepares data for parity generation of the stripe arrays of LU 261. Thus it is no longer necessary to read the LBA set 3 and LBA set 8 indicated by oblique lines of the LU 262. In addition, although disk access must occur to the disk devices 271–274 during reading of the LBA sets 4–7 of LU 261 for copying purposes, in such case, LBA set 3 is also read consecutively by a single disk command when reading LBA set 7. Similarly when reading LBA set 4, LBA set 8 also is consecutively read by a single disk command. Reading data by a single disk command makes it possible to reduce a time for disk access to LBA sets 3, 8.

In brief, in accordance with this invention, whenever an LBA set necessary with copy for mirror resynchronization is present, the n-RAID control subprogram 236 reads an alternative LBA set from the mirror primary LU to thereby permit assortment or equalization of all the LBA sets within the stripe arrays of the mirror secondary LU including LBA sets. In this event, if an LBA set alternative to the LBA set of the mirror secondary LU is present within the disk device of the mirror primary LU that stores therein any LBA set with a need for copy for resynchronization purposes, then a time taken to perform reading is shortened in a similar way to that of FIG. 5. With respect to the mirror secondary LU, the m-RAID control subprogram 237 executes writing of a copy-necessary LBA set(s) and writing of a parity thus generated.

Additionally, detection of such copy-necessary LBA set (s) is performed by the mirror resynchronous subprogram 232 by referring to the update position management table 222 in a similar way to the case of FIG. 5.

Also note that in view of the fact that disk access number reduction is hardly possible in some cases, the read position of LU 261 and the write position of LU 262 may be calculated in such a way as to perform normal copying.

Figure 4:
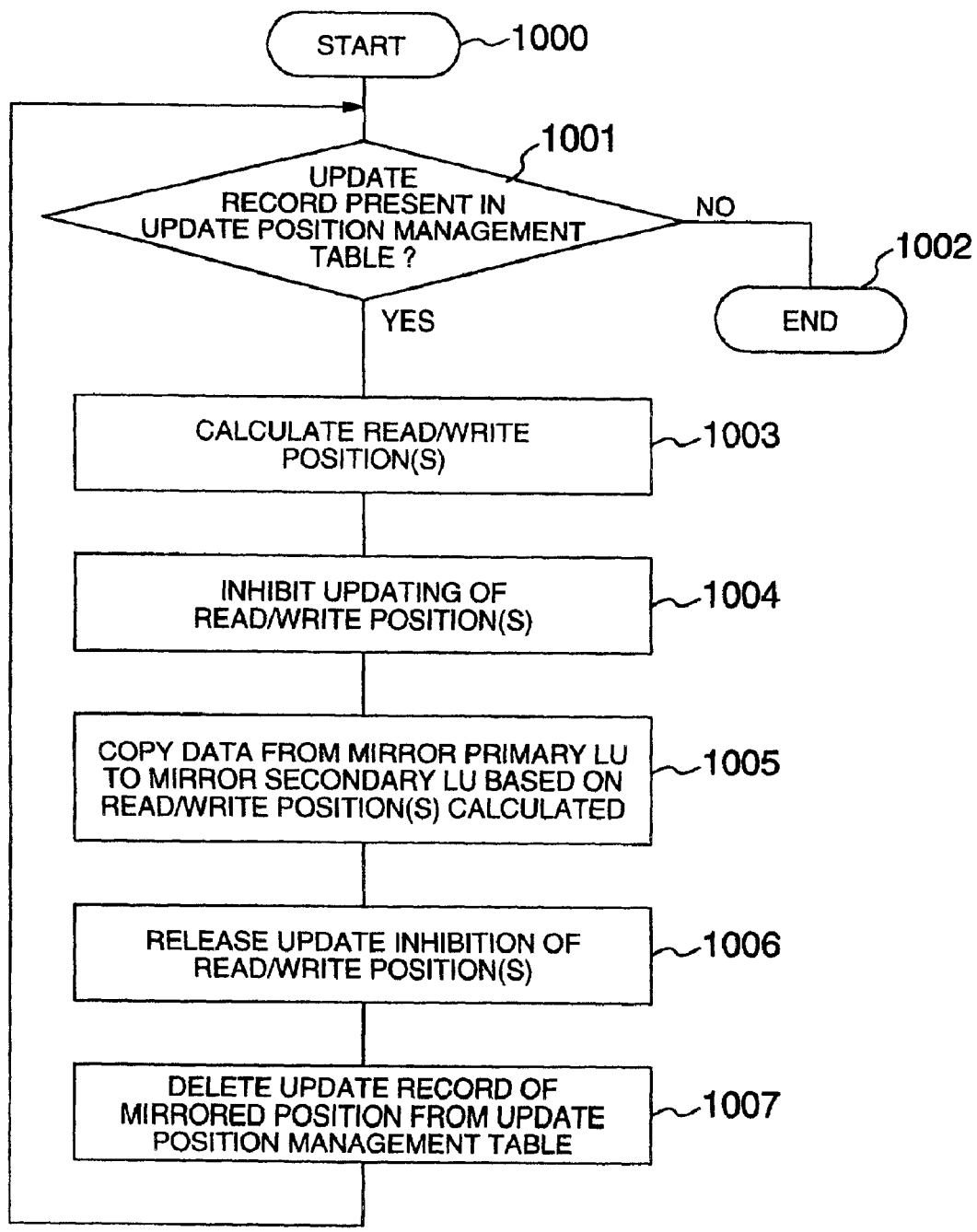
FIG. 4 is a flow diagram of an operation of a mirror re-synchronous sub-program in the first embodiment.

FIG. 4 is a flow chart showing an operation of the mirror resynchronous subprogram 232 at the time of mirror resynchronization.

Firstly, the mirror resynchronous subprogram 232 conducts investigation to determine whether 1 is present as an update record in the update bits of the update position management table 222 (at step 1001). If the update record value "1" is absent then terminate processing since the mirror resynchronization was completed (at step 1002).

In case the value "1" is present at the updated bits, the mirror resynchronous subprogram 232 computes both a read position of the LU 261 and write position of LU 262 in a way as has been explained in conjunction with FIGS. 5 and 6 (at step 1003). Next, inhibit updating of any subject read/write positions (at 1004); then, based on the read/write positions thus computed, the n-RAID control subprogram 236 and m-RAID control subprogram 237 make use of the method as has been explained in FIG. 5 and FIG. 6 to copy any condition-fulfilled data from the LU 261 that functions as the mirror primary LU to the LU 262 acting as the mirror secondary LU (1005).

Next, the mirror resynchronous subprogram 232 releases the update inhibition of any applicable read/write positions (at step 1006) and then sets 0 at an update bit at the position which is present within the update position management table 222 and was mirrored by copying to thereby delete the update record (at 1007); thereafter, return to step 1001.

An explanation will be given of an operation of the computer 100 during data read and write plus snap shot reading.

First, an operation of the database program 126 in case the computer 100 provides access to data of the LU 261 in the disk array apparatus 200 will be explained. The database program 126 performs the same operation irrespective of whether snap shot acquisition is present or absent.

In case the database program 126 reads data of the LU 261, the database program 126 issues to the disk array apparatus 200 a "READ" command for reading the data of LU 261. The database program 126 receives data and a status from the disk array apparatus 200 and then terminates its operation. Alternatively in case the database program 126 writes data into LU 261, the database program 126 issues to the disk array apparatus 200 a "WRITE" command for writing data into the LU 261 and then transfers data. The database program 126 receives a status from the disk array apparatus 200 and then finishes its operation.

An explanation will next be given of an operation of the backup program 127 in the event that the computer 100 reads a snap shot of the LU 261 that exists in the disk array apparatus 200.

In case the backup program 127 reads a snap shot of the LU 261, the backup program 127 issues to the disk array apparatus 200 a READ command for reading data of LU 262 which serves as the mirror secondary LU of the LU 261. The backup program 127 receives data and status from disk array apparatus 200 and then ends its operation.

An operation of the disk array apparatus 200 during data reading and writing plus snap shot reading will be explained below.

First, an operation of the snap shot management program 221 in the event that the computer 100 gives access to the data of the LU 261 residing in the disk array apparatus 200 will be explained.

In case the computer 100 reads data of the LU 261, the snap shot management program 221 receives a "READ" command with respect to LU 261. Next, if the LU mirror subprogram 231 is presently validated and also if copy of an updated portion due to the mirror resynchronous subprogram 232 has been completed then the snap shot management program 221 reads data out of either the LU 261 or the LU 262 acting as the mirror secondary LU. Otherwise, it reads data from LU 261. After having read the data, the snap shot management program 221 transfers both the read data and status toward the computer 100. In case the LU 261 and the LU 262 acting as the mirror secondary LU are identical in content to each other, load is distributed by reading data from either one of the both.

In case the computer 100 writes data into the LU 261, the snap shot management program 221 receives a "WRITE" command and data with respect to the LU 261. Next, if the LU mirror subprogram 231 is presently effective then the snap shot management program 221 writes data into the LU 261 and the LU 262 serving as the mirror secondary LU; if invalid then write data into LU 261. Next, if both the non-mirror event update monitor subprogram 234 and non-mirror event update position management subprogram 235 are effective then the snap shot management program 221 sets 1 to the update bit of an LBA set including the data of LU 261 as updated relative to the update position management table 222; if invalid then it does nothing. Lastly, send a status to the computer 100.

An operation will next be given of an operation of the snap shot management program 221 in cases where the computer 100 reads a snap shot of the LU 261 residing in the disk array apparatus 200.

In case the computer 100 reads a snap shot of the LU 261, the snap shot management program 221 receives a READ command with respect to the LU 262 serving as the mirror secondary LU of LU 261. Next the snap shot management program 221 reads data out of the LU 262 acting as the mirror secondary LU. After having read the data, the snap shot management program 221 sends forth the read data and status toward the computer 100.

Note here that while any updated portion is being copied and duplicated by the mirror resynchronous subprogram 232, data access performance decreases due to the fact that the copy processing and the data access processing to the LU 261 by the computer 100 are concentrated on the same LU 261.

In accordance with this embodiment, in the disk array apparatus employing the duplex/mirroring scheme for snap shot acquisition, in case n and m are set at certain integers greater than or equal to 2 and are of different values, it becomes possible to assembly both the disk array having a memory region of the original data and the disk array having a memory region for provision as a snap shot into disk arrangements of nD+1P and mD+1P, respectively; thus, there is an effect which enables each disk array to employ a flexible configuration.

Thus, it is possible to keep pace with the requirements to the memory region of the original data and to the memory region for provision as a snap shot when looking at in viewpoints of performance, reliability, costs and the like. For example, consider one specific case where the same disk device is used to constitute the memory region of original data into 4D+1P while arranging the memory region for provision as a snap shot into 8D+1P. With regard to the reliability, 4D+1P significant in ratio of redundancy disk device number offers superiority; on the other hand, regarding bit costs, 8D+1P less in ratio of redundancy disk device number is more excellent. Assuming that the case where the disk device becomes a bottle neck of the performance, consecutive data read performance as a disk array is such that 8D+1P offers the performance two times greater than the other. In this way, by establishing mirroring at the disk arrays different in nD+1P, it becomes possible to successfully accommodate a variety of requirements to the memory region of original data and the memory region for provision as a snap shot.

In addition, although snap shot management methods employing data duplex/mirroring schemes are faced with a problem that both normal access for doing update/referring and copy access of update data are concentrated on the memory region of original data at the time of mirror resynchronization causing the normal access to decrease in performance, the embodiment discussed above offers an advantage which follows: it is possible by reading the mirror primary LU in a way synchronous with the stripe arrays of a mirror secondary LU to shorten a mirror resynchronization time which otherwise results in a decrease in performance.

Note here that although in the present invention the interface for connection between the computer 100 and disk array apparatus 200 is designed by the SCSI bus 300, other interfaces may be employed such as fibre channels or else.

Figure 7:
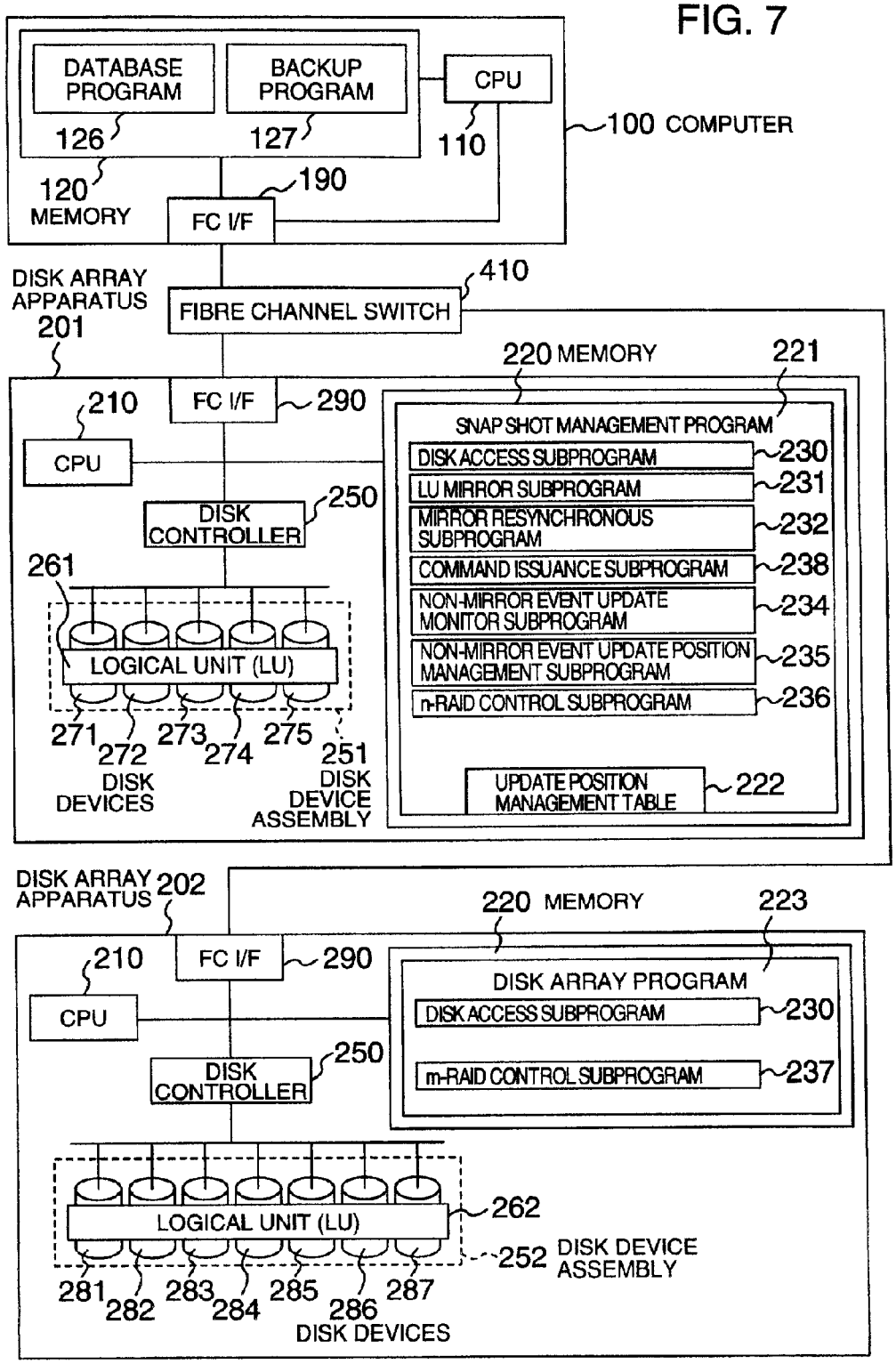
FIG. 7 is a diagram showing a system configuration in a second embodiment of the invention.

Turning to FIG. 7, there is shown a configuration of a computer system with duplex/mirroring architecture in accordance with a second embodiment of this invention.

The embodiment of FIG. 7 is the one that incorporates the principles of the present invention into a computer system in which the disk device assemblies in the first embodiment are arranged by separate disk apparatuses. With this embodiment, the use of such separate disk apparatuses makes it possible to apply the present invention not only for the purpose of snap shot utilization but also for the purpose of mirroring of data to remote sites. An explanation will be given of those portions different from the first embodiment.

As shown in FIG. 7 the system of this embodiment has a computer 100, disk array apparatus 201, and disk array apparatus 202. This system is different from that of the first embodiment in that the former has a plurality of disk array apparatuses.

A difference of the computer 100 from that of the first embodiment is that this computer has an FC interface 190 and is connected to the remaining apparatus through the FC interface 190.

A difference of the disk array apparatus 201 over the disk array apparatus 200 of the first embodiment is that the disk device assembly 252 and m-RAID control subprogram 237 are removed away from the disk array apparatus 200. Another difference is that a command issuance subprogram 238 which issues a command or commands in order to perform data transfer relative to the other disk array apparatus or the like is provided within the snap shot management program 221. In addition, the disk array apparatus 202 has an FC interface 290 in place of the SCSI interface 240 and is connected to the other apparatus via the FC interface 290.

A difference of the disk array apparatus 202 over the disk array apparatus 200 of the first embodiment is as follows: the disk device assembly 251 and snap shot management program 221 are removed away from the disk array apparatus 200, with a disk array program 223 provided in a memory 220. Additionally the disk array apparatus 202 has an FC interface 290 as an alternative to the SCSI interface 240 and is connected to the other apparatus via the FC interface 290.

The disk array program 223 has its disk access subprogram 230 and m-RAID control subprogram 237, which are substantially the same as those of FIG. 1 of the first embodiment.

The command issuance subprogram 238 of the disk array apparatus 201 issues to the disk array apparatus 202 a command for access to an LU 262 within the disk array apparatus 202 by way of a fiber channel switch 410. Accordingly, the disk array apparatus 201 operates while handling as the mirror secondary LU an LU 262 residing in the disk array apparatus 202 as connected via the fibre channel switch 410 in a similar way to that of the first embodiment. Similarly the other program or programs execute copying or the like of data at the LU 261 and LU 262 by way of the fibre channel switch 410.

Additionally an operation of the snap shot management program 221 in case the computer 100 gives access to the data of the LU 261 existing in the disk array apparatus 201 may be arranged so that only the mirror primary LU 261 is subjected to reading even where the LU 261 and the LU 262 acting as the mirror secondary LU are identical in content to each other.

According to this embodiment, in the plurality of disk array apparatuses implemented to operate under the duplex/mirroring architecture, in case n and m are set at integers greater than or equal to 2 and are of different values, it becomes possible to assembly the disk array having a memory region of the original data and the disk array having a memory region for provision as a snap shot into disk arrangements of nD+1P and mD+1P respectively. This in turn makes it possible to arrange each disk array apparatus to employ a flexible configuration.

It must be noted that although in this embodiment the interface for connection between the computer 100, disk array apparatus 201 and disk array apparatus 202 is designed by a fibre channel, it may be other interfaces such as for example SCSI, interfaces having compatibilities with the Internet.

So far, the first and second embodiments have been explained.

It is noted that in the present invention, either one of the mirror primary LU and the mirror secondary LU or both may be designed to have an arrangement of RAID levels other than the RAID 5. In this case the n-RAID control subprogram 236 for performing RAID control of nD+1P and the m-RAID control subprogram 237 for performing RAID control of mD+1P may be arranged to execute control in a way pursuant to the RAID levels of the mirror primary LU and mirror secondary LU respectively.

Also note that the present invention is also applicable to multiplex mirroring architectures employing a plurality of mirror secondary LUs. In this case, a certain number of update bit columns of the update position management table 222 corresponding to the mirror secondary LUs are provided for causing the LU mirror subprogram 231 to perform an operation for duplexing an access event to the mirror primary LU into the plurality of mirror secondary LUs. Additionally such multiplexed mirror secondary LUs are arranged by a disk array of tD+1P, where t is a given integer greater than or equal to 2. And, design the disk array apparatus to include therein a RAID controller capable of controlling the disk array with this tD+1P arrangement. Note here that more than one of the mirror secondary LUs may have a RAID arrangement different from the ND+1P arrangement of the mirror primary LU.

As has been described above, in accordance with the present invention, in a disk array as implemented to operate based on duplex/mirroring schemes for snap shot acquisition, it becomes possible to design a disk array having its memory region of the original data and a disk array having a memory region for provision as a snap shot into disk arrangements of nD+1P and mD+1P respectively, where "n" and "m" are different integers more than or equal to 2, which in turn makes it possible to permit each disk array to employ a mutually flexible arrangement.

It will be further understood by those skilled in the art that the foregoing description has been made on embodiments of the invention and that various changes and modifications may be made in the invention without departing from the spirit of the invention and scope of the appended claims.

What is claimed is:

1. A method for copying data in a disk array apparatus coupled to a computer, said disk array apparatus comprising m+n disk devices partitioned into a first group of n disk devices and a second group of m disk devices, m and n being different integers:

storing data received from said computer in both of said n disk devices of said first group and said m disk devices of said second group for maintaining duplicated data;

halting duplicating data based on an instruction from said computer;

storing data received from said computer, during interruption of data duplicating, in n disk devices of said first group while recording location information of stored data;

restarting data duplicating based on an instruction from said computer;

reading data of m−1 units from said first group of n disk devices;

forming redundant data based on the data of m−1 units read from said first group of n disk devices; and storing certain data of m−1 units as designated by the recorded location information and said redundant data in said m disk devices of said second group.

2. A disk array apparatus comprising:

n+m disk devices partitioned into n disk devices and m disk devices, n and m being different integers;

an n control means for controlling said n disk devices;

an m control means for controlling said ni disk devices, an interface connected to a computer;

duplex means for storing data received from said computer in both of said n disk devices and said m disk devices;

means for interrupting said duplex means in accordance with an instruction from said computer; and update management means for recording location information indicating location in said n disk devices to which data received from said computer is stored during interruption of said duplex means;

wherein when copying data from said n disk devices to said m disk devices, said n control means reads data of m−1 units from said n disk devices, said in control means forms redundant data based on the data of m−1 units read from said n disk devices, and said m control means stores each data of m−1 units and said redundant data in said m disk devices; and wherein said m control means stores certain data designated by said location information in said m disk devices, when said duplex means restarts data duplicating in accordance with an instruction from said computer.

3. The disk array apparatus according to claim 2 wherein said unit is a predetermined data length with a logical block address as a reference.

4. A disk array system comprising:
n+m disk devices;
a processor;
a memory storing programs executed by said processor;
a mirror primary LU in n disk devices wherein, in said mirror primary LU, data of n−1 units and redundant data generated from said data of n−1 units are stored in said n disk devices;
a mirror secondary LU in m disk devices wherein, in said mirror secondary LU, data of m−1 units and redundant data generated from said data of m−1 units are stored in said m disk devices;
an n-RAID control subprogram stored in said memory for performing RAID control of the mirror primary LU;
an m-RAID control subprogram stored in said memory for performing RAID control of the mirror secondary LU;
an LU mirror subprogram stored in said memory for writing data received from a computer into said mirror primary LU and said mirror secondary LU for maintaining duplicated data in said mirror primary LU and said mirror secondary LU;
a non-mirror event update monitor subprogram stored in said memory for monitoring data update with respect to said mirror primary LU upon interruption of duplicating data between said mirror primary LU and said mirror secondary LU;
a non-mirror event update position management subprogram stored in said memory for recording an update position of said data update with respect to said mirror primary LU; and
a mirror resynchronous subprogram stored in said memory for copying data designated by the recorded update position from said mirror primary LU to said mirror secondary LU,
wherein n and m are different integers.

5. The disk array system according to claim 4,
wherein when said mirror resynchronous subprogram is executed, said n-RAID control subprogram reads data from said mirror primary LU, the read data is included in a same stripe of said mirror secondary LU as data copied by said mirror resynchronous subprogram, and
wherein said m-RAID control subprogram generates new redundant data based on the data read by said n-RAID control subprogram and the data copied by said mirror resynchronous subprogram and stores the new redundant data and the data copied by said mirror resynchronous subprogram in said mirror secondary LU.

6. A disk array system comprising:
a first disk array system comprising n disk devices; and
a second disk array system comprising m disk devices,
wherein said first disk array comprises
a mirror primary LU in said n disk devices wherein, in said mirror primary LU, data of n−1 units and redundant data generated based on said data of n−1 units are stored;
an n-RAID control subprogram for performing RAID control of said mirror primary LU;
an LU mirror subprogram for writing data received from a computer into said mirror primary LU and sending said data to said second disk array system;
a non-mirror update monitor subprogram for monitoring data update with respect to said mirror primary LU during interruption of duplicating data between said first disk array system and said second disk array system;
a non-mirror event update position management subprogram for recording an update position of said data update with respect to said mirror primary LU; and
a mirror resynchronous subprogram for copying data designated by said recorded update position from said mirror primary LU to said second disk array system; and
wherein said second disk array system comprises
a mirror secondary LU in said m disk devices wherein, in said mirror secondary LU, data of m−1 units and redundant data generated based on said data of m−1 units are stored; and
an m-RAID control subprogram for performing RAID control of said mirror secondary LU, and said m-RAID control subprogram generates redundant data corresponding to data received from said first disk array system, and stores said redundant data and said data received from said first disk array system into said mirror secondary LU,
wherein said n and m are different integers.

7. The computer system according to claim 6 wherein said mirror primary LU and said mirror secondary LU have different levels of RAID configuration.

* * * * *